United States Patent
Staples et al.

(10) Patent No.: US 8,896,597 B2
(45) Date of Patent: Nov. 25, 2014

(54) SYSTEM AND METHOD FOR MODIFYING GEOMETRIC RELATIONSHIPS IN A SOLID MODEL

(75) Inventors: Daniel C. Staples, Cape Elizabeth, ME (US); Mallikarjuna Gandikota, Pune (IN); Aditya N. Gurushankar, Madison, AL (US); Jeffrey A. Walker, Huntsville, AL (US); Howard C. D. Mattson, Impington (GB); Douglas J. King, Peterborough (GB); Neil G. Mackay, Midlothian (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1142 days.

(21) Appl. No.: 12/422,399

(22) Filed: Apr. 13, 2009

(65) Prior Publication Data
US 2009/0259442 A1    Oct. 15, 2009

Related U.S. Application Data

(60) Provisional application No. 61/044,612, filed on Apr. 14, 2008.

(51) Int. Cl.
G06T 17/00 (2006.01)
G06F 17/50 (2006.01)
G06T 19/20 (2011.01)
G06T 17/10 (2006.01)

(52) U.S. Cl.
CPC ............ *G06F 17/50* (2013.01); *G06T 19/20* (2013.01); *G06F 2217/06* (2013.01); *G06T 17/10* (2013.01); *G06T 2219/2021* (2013.01)
USPC ........................................... 345/420

(58) Field of Classification Search
CPC ...... G06F 17/50; G06F 2217/06; G06T 17/00; G06T 17/10; G06T 19/00; G06T 19/20
USPC .................................................. 345/419–420
See application file for complete search history.

(56) References Cited

U.S. PATENT DOCUMENTS 6,441,837 B1 * 8/2002 Harding et al. ............... 715/856
6,629,065 B1 * 9/2003 Gadh et al. ....................... 703/1

(Continued)

FOREIGN PATENT DOCUMENTS

| JP | H0589210 A | 4/1993 |
| JP | H0887608 A | 4/1996 |
| JP | 2003162550 A | 6/2003 |

OTHER PUBLICATIONS

Sohrt, et al. Published in Proceedings. Symposium on Solid Modeling Foundations and CAD/CAM Applications, Jun. 5, 1991 (pp. 387-396); Magazine.

(Continued)

*Primary Examiner* — Edward Martello
*Assistant Examiner* — Charles Tseng

(57) ABSTRACT

A system, method, and computer program for modifying a solid model representation that is manipulated in a computer having software instructions for design, comprising: a computer system, wherein the computer system includes a memory, a processor, a user input device, and a display device; a computer generated geometric model stored in the memory in the memory of the computer system; and wherein the computer system receives user input and accesses at least one data file having a plurality of geometric model definitions that define a geometric model; converts the geometric model definitions into a geometric representation of the geometric model; calculates a plurality of geometric conditions between at least one geometry identified by a user and the geometric model to create a set of constraints; and calculates a modified geometric model with a modified geometry according the set of constraints to display to the user; and appropriate means and computer-readable instructions.

19 Claims, 9 Drawing Sheets

(56) References Cited

U.S. PATENT DOCUMENTS

| | | | | |
|---|---|---|---|---|
| 6,646,641 | B1* | 11/2003 | White et al. | 345/428 |
| 6,822,653 | B2* | 11/2004 | Boyd et al. | 345/474 |
| 7,042,451 | B2* | 5/2006 | Venkataraman et al. | 345/420 |
| 7,062,341 | B1* | 6/2006 | Karaikurichi | 700/97 |
| 7,313,504 | B2* | 12/2007 | Chin et al. | 703/1 |
| 7,492,364 | B2* | 2/2009 | Devarajan et al. | 345/420 |
| 7,623,139 | B1* | 11/2009 | Gifford et al. | 345/619 |

OTHER PUBLICATIONS

Hsu, et al. Published in Proceedings of the Fourth Symposium on Solid Modeling and Applications, Vol. Symp. 4, May 14, 1997 (pp. 168-180); Magazine.

Sutherland. Published in Proceedings of the Spring Joint Computer Conference. vol. 1963, vol. 23, May 1, 1963 (pp. 329-346); Magazine.

Chinese Office Action dated Sep. 13, 2012 in connection with Chinese Application No. 200980122084.3.

Sun Jianghong et al., China Railway Press, "Introduction and Application, Pro/Engineer 2001 (Chinese Version)", Apr. 30, 2003, 12 Pages.

Japanese Office Action dated Dec. 7, 2012 in connection with Japanese Application No. 2011-505009, 15 pages.

Wolfgang Sohrt, et al. "Interaction with Contraints in 3D Modeling", Department of Computer Science, University of Utah, 1991 ACM 089791-427-9/91/0006/0387, pp. 387-396.

C. Hsu, et al. "A Constraint-based Manipulator Toolset for Editing 3D Objects", Computer Science Department, University of Utal, Technical University of Ilmenau, Germany, 1997 ACM 0-89791-946-7/97/05, pp. 168-180.

Chinese Office Action dated Sep. 13, 2012 in connection with Chinese Application No. 200980122084.3, 10 pages.

English Translation of Sun Jianghong et al., China Railway Press, "Introduction and Example Application, Pro/Engineer 2001"(chinese version cited in IDS on Jan. 3, 2013) 19 pages.

Decision to Grant a Patent issued Mar. 31, 2014 for Japanese Patent Application No. 2011-505009; 4 pages.

* cited by examiner

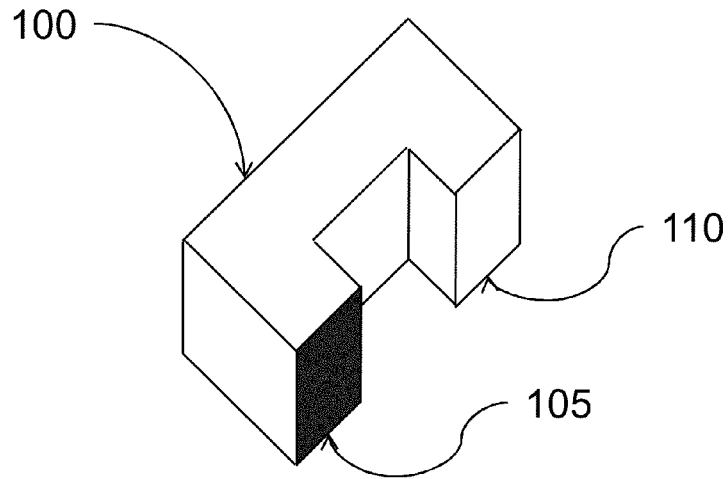
*Fig. 1a*
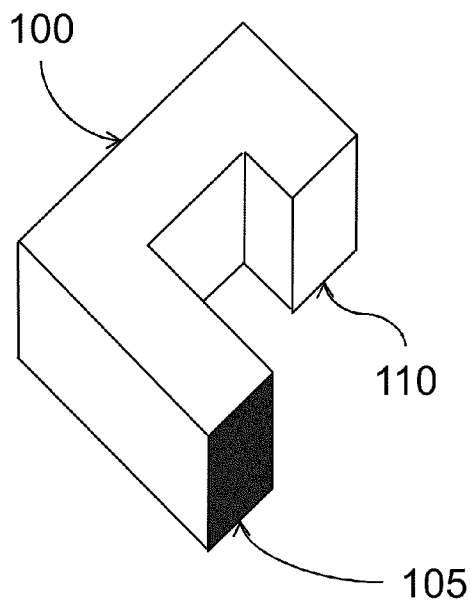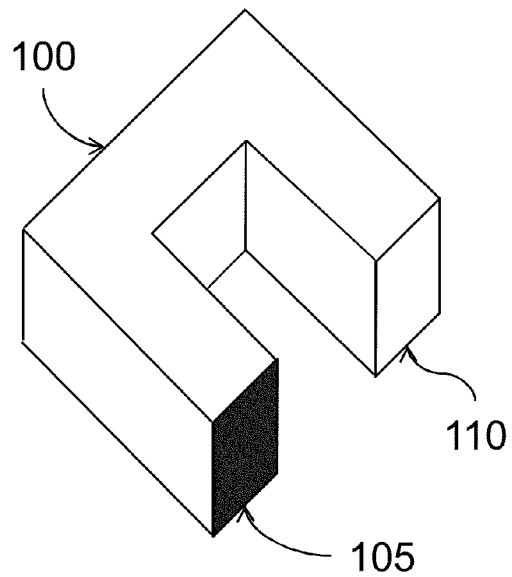
*Fig. 1b*    *Fig. 1c*
*Figs. 1a-1c*

SYSTEM AND METHOD FOR MODIFYING GEOMETRIC RELATIONSHIPS IN A SOLID MODEL

CROSS-REFERENCE TO RELATED APPLICATIONS

This application claims priority to Provisional U.S. Application Ser. No. 61/044,612, filed on Apr. 14, 2008.

TECHNICAL FIELD

The system of the innovations described herein relates generally to computer-aided design software applications. More specifically, the system relates to recognizing geometric relationships in a solid model representation.

BACKGROUND

In today's world of computer-aided design (CAD) applications, parts are commonly designed in one of two ways: history-based or history-less. A history-based system is commonly characterized by the parametric modeling paradigm that emerged in the mid-1980s. In parametric modeling systems, a recipe, or history tree, is created to reflect how things are related to one another. When a change is made to one original item, all items created later in time from the original item are updated. In this way, for example, two faces may remain coplanar, because they were designed with such a relationship captured during the design process and simply "replayed" during the update process. FIGS. 1a-1c illustrate a trimetric projection of a three-dimensional block. Referring to FIG. 1a, a C block 100 in three-dimension ("3D") is viewable to a user on a computer display and is in need of a modification by a user by altering a bottom leg 105, a top leg 110, or both the bottom leg 105 and the top leg 110. In a history-based system, how easily the user modifies the C block 100 depends upon how it was originally designed in the CAD application system, such as SolidEdge by Siemens Product Lifecycle Management Software Inc. Commonly, an original designer creates and/or designs a part that is later modified by a modify designer who maybe completely unfamiliar to the original designer. For example, if the original designer, i.e., the person that originally designed the C block 100, had the design method intent to constrain the faces related to the bottom leg 105 and the top leg 110 as coplanar, then the modification action illustrated in FIG. 1c is easy to accomplish using known parametric/history-based modeling techniques that are basic to one skilled in the art of 3D model design, but for simple explanation because the two faces are constrained to be coplanar, moving one face will cause the other face to move as well. If on the other hand, the modify designer intends to move only the face associated with the bottom leg 105 while leaving the top leg 110 alone, e.g., FIG. 1b, then several additional steps must transpire to remove the coplanar constraint requiring several additional steps that begins with understanding how the two legs of the C block 100 were created if the modify designer was not the original designer. Furthermore, if the original designer of the C block 100 did not model the bottom leg 105 and the top leg 110 to be coplanar but modeled the legs by some other method such as a distance or a formula, then to modify both as seen in FIG. 1c would increase the difficulty to a point where the modify designer may as well model the C block 100 from scratch.

On the other hand, modifying the C block 100 in a history-less or the body-based approach taken by companies like CoCreate, IronCAD, and Kubotek, for example, fails to maintain the history-tree made popular by the parametric modeling paradigm. In the history-less approach, changes are made explicitly for each item on a solid model. If the original designer of the C block 100 intended that the faces on the bottom leg 105 and the top leg 110 maintain a coplanar relationship, later modifications require the manual selection of the faces for edit to ensure the desired result, which is difficult if the original designer's intent is unknown or unascertainable. For example, the modify designer can make either change illustrated in FIG. 1b or FIG. 1c simply be selecting the one face or individually select all of the other coplanar faces, which happens to be a small number in this example but could be in the hundreds in a complex assembly model. Alternatively, some software applications could allow the modify designer to "make faces coplanar" and permanently capture a design intent after the fact at time of edit, but this can also be cumbersome particularly with very large models. The design intent is the intent of the original designer of the solid model in how the model was designed. Alternatively the design intent could reflect the intent of the modification designer of the solid model. This later alteration would make the modification see in FIG. 1b difficult at a later date particularly since now the design intent may be baked into the model contrary to design intent.

The issue with the history-based approach is that design intent is incorporated and fixed at the time of model creation, which can complicate making changes later-on that were not anticipated at the time of model creation. In contrast, the history-less systems are flexible about change at a later date, but capture very little intelligence about how things are related. If modify designers determine to manually capture such intelligence at a later point in time, then, like history-based systems, that intelligence is incorporated and fixed thereby limiting further flexibility.

The inventors have advantageously recognized a need for a system and method to provide direct edit capabilities on a solid model where the current geometry is examined and joined with various model constraints so that dependencies are localized in real-time.

SUMMARY

To address the identified need and related problems, a system provides a system for modifying a solid model representation that is manipulated in a computer having software instructions for design, comprising a computer system, wherein the computer system includes a memory, a processor, a user input device, and a display device; a computer generated geometric model stored in the memory in the memory of the computer system; and wherein the computer system receives user input and accesses at least one data file having a plurality of geometric model definitions that define a geometric model; converts the geometric model definitions into a geometric representation of the geometric model; calculates a plurality of geometric conditions between at least one geometry identified by a user and the geometric model to create a set of constraints; and calculates a modified geometric model with a modified geometry according to set of constraints to display to the user. The system, wherein the computer system further saves a modified geometric representation of the modified geometric model into the at least one data file. The system, wherein the computer system further removes the set of constraints from the geometric model. The system, wherein the at least one data file is one of a geometric modeler transmit file, a modeling toolkit information file, and a solid model part file. The system, wherein the geometric representation is in a boundary representation format. The system, wherein the geometric model is a solid model. The system, wherein the plurality of geometric conditions are calculated in a recursive manner to at least one level of recognition.

Other features of the system are set forth in part in the description and in the drawings that follow, and, in part are learned by practice of the system. The system will now be described with reference made to the following Figures that form a part hereof. It is understood that other embodiments may be utilized and changes may be made without departing from the scope of the system.

BRIEF DESCRIPTION OF THE DRAWINGS

A system will hereinafter be described in conjunction with the appended drawings, wherein like designations denote like elements, and:

FIGS. 1a-1c illustrate a trimetric projection of a three-dimensional block;

DETAILED DESCRIPTION OF THE PREFERRED EMBODIMENTS

1. Introduction

A method and system for modifying geometric relationships in a solid model are described. In the following description, for the purposes of explanation, numerous specific details are set forth in order to provide a thorough understanding of the system. It will be apparent, however, to one skilled in the art that the system may be practiced without these specific details. In other instances, well-known structures and devices are shown in block diagram form in order to avoid unnecessarily obscuring the system.

Figure 2:
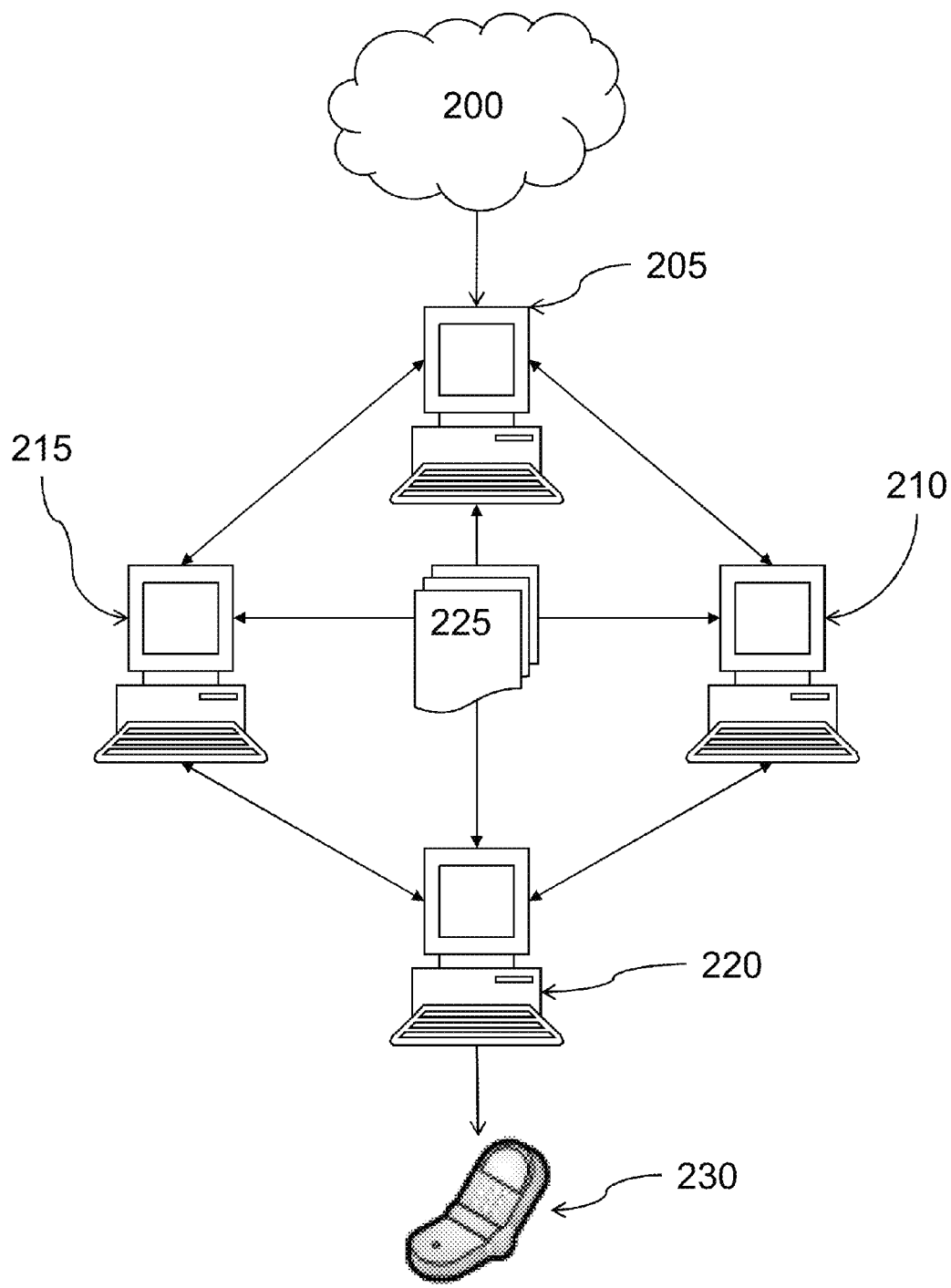
FIG. 2 illustrates a sample virtual product development environment.

FIG. 2 illustrates a sample virtual product development environment. The virtual development environment employed today typically begins with a customer request, or an innate desire, to create or improve upon a product, generally shown at 200. That product can be as simple as a bottle opener or as complex as a submarine. Referring further to FIG. 2, an original designer models a desired product according to known methods employed by a computer-aided design (CAD) application 205, The CAD application 205 is executed on a general computing machine which subsequently becomes a specific purpose computing environment for the sake of executing computer-aided design routines at the time of application execution and interaction, the details of which are discussed below. The CAD application 205 is preferably SolidEdge or NX both offered for license by Siemens Product Lifecycle Management Software Inc. A CAD user operates the CAD application 205 in a well known and understood manner so as to virtually display a solid model that resembles and conforms to an original design requirement ascertained from the customer request or the innate desire. The solid model is commonly an assembly of components and assemblies, where the assemblies are further broken down into sub-assemblies and/or components, all preferably having a virtual representation stored for subsequent recall in solid model data files 225.

Once the solid model is determined to be in a suitable form comporting to the original design requirements, it is preferably tested using a computer-aided engineering (CAE) application 210 such as NX CAE or FEMAP offered by Siemens Product Lifecycle Management Software Inc by a CAE user for part fault-tolerance tests and a variety of other engineering tests. If the CAE user determines that the solid model has to be modified to successfully pass the fault-tolerance tests the solid model is returned to the CAD user for modification in the CAD application 205. This iteration between the CAD application 205 and the CAE application 210 and the respective users is recursive until the solid model successfully passes necessary design requirements and engineering test.

Following successful completion, the solid model in its final design form is further designed for physical manufacture in a computer-aided manufacturing (CAM) application 215 such as NX CAM or CAM Express both offered by Siemens Product Lifecycle Management Software Inc. By using the CAM application 215, a CAM user will model how numerical control programs, molds, tools and dies manufacture a physical product 230. The CAM user may have additional modifications to comport to the original design requirements, for example, using electro-discharge machining (EDM) may require different techniques depending if a wire-cut EDM or die-sinking EDM is used to manufacture the physical product 230. To virtually mill a part, the CAM application 215 defines the preferably electrode path of the orbit for the EDM process. The CAM user may determine that in order to comport to design and engineering requirements, the solid model requires a subtle modification in dimensions, for example following a cool-down to allow for hardening of the material comprising the physical product 230.

Following the successful virtual designing, engineering, and manufacturing of the product, a manufacturer can link all manufacturing disciplines with product engineering related to the product including: process layout and design, process simulation/engineering, and production management utilizing a digital factory application 220 such as Tecnomatix offered by Siemens Product Lifecycle Management Software Inc. The manufacturer may find the need to modify the physical product 230 because the CAM users modeled the product with, for example, an EDM system that is outdated and requires the manufacturer to use a 5-axis turning machine to create the necessary blank or the manufacturer has shifted to injection molding rather than compression molding to form the parts that comprise the physical product 230. For example, the solid model has to be modified to comport to the final requirements to manufacture the physical product 230.

Throughout the virtual product development described above, the product design flowed for example from the customer request to the CAD user to the CAE user to the CAD user, back to the CAE user, to the CAM user, and then to the Manufacturer for physical production of the physical product 230. With each edit to the solid model, geometric relationships are also modified so as to comport to the necessary design changes by the CAD user, the CAE user, the CAM user, and the Manufacturer, for example. Further as each of the CAD/CAE/CAM users modify the solid model, a data model that defines the solid model is also modified to properly account for the changes discussed above and properly stored in the solid model data files 225. The manufacturer then proceeds to produce the physical product 230 according to the original design specifications and subsequent engineering modifications. The virtual product development occurs in a system, where the system and method for modifying geometric relationships in a solid model is executable in a variety of software applications resident in memory on a variety of hardware systems, described in more detail below.

2. Computer Program Product

Figure 3:
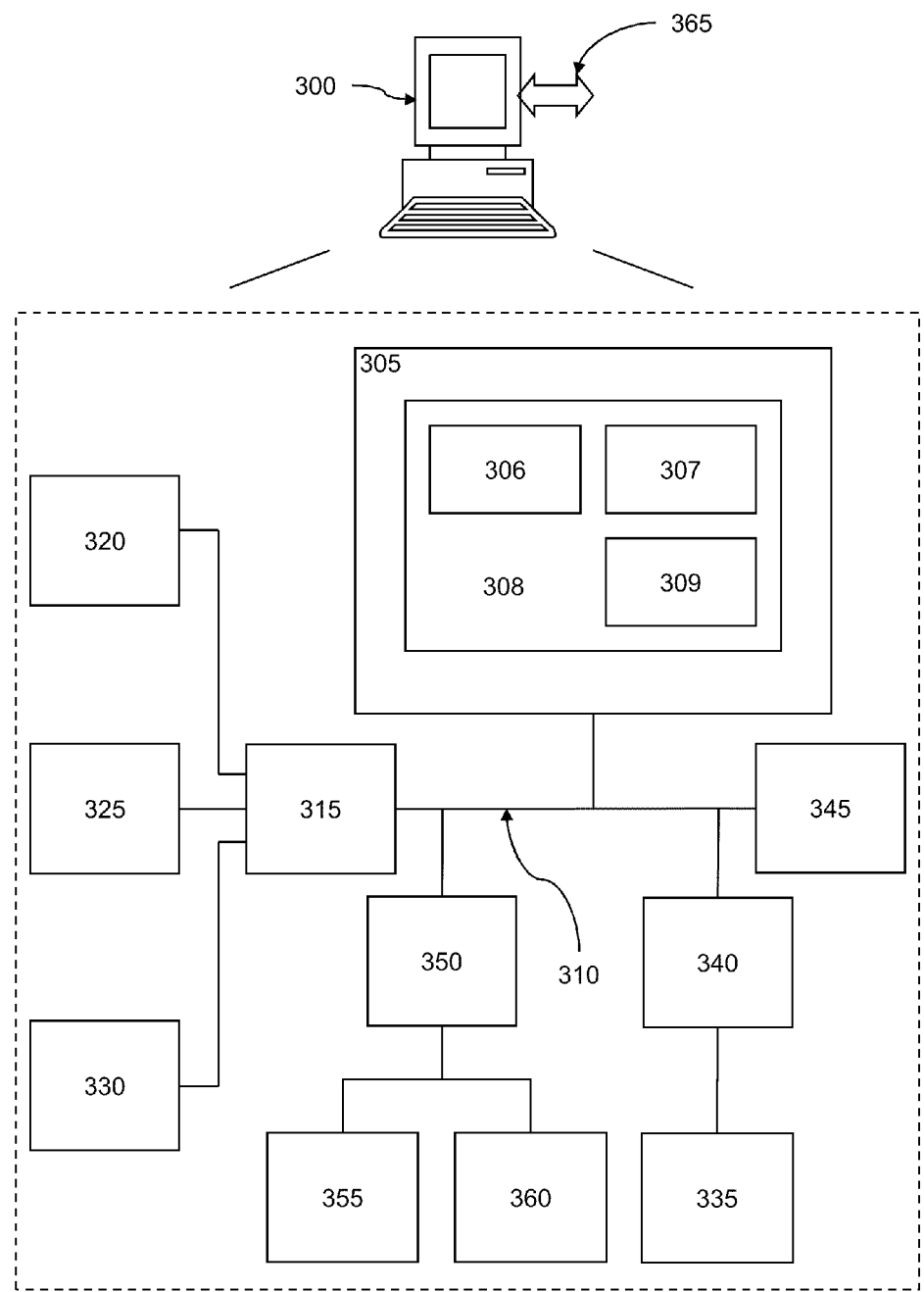
FIG. 3 is a block diagram of a computer system in which the system may be practiced.

Turning now to a hardware system, FIG. 3 is a block diagram of a computer system in which the system may be practiced. FIG. 3 and the following discussion are intended to provide a brief, general description of a suitable hardware system and computing environment in which the embodiment may be implemented. The embodiment may be performed in any of a variety of known computing environments.

Referring to FIG. 3, an exemplary computer system includes a computing device in the form of a computer 300, such as a desktop or laptop computer, which includes a plurality of related peripheral devices (not depicted). The computer 300 includes a central processing unit (CPU) 305 and a bus 310 employed to connect and enable communication between the central processing unit 305 and a plurality of components of the computer 300 in accordance with known techniques. The operation of the CPU 305 is well understood in the art that is preferably an electric circuit that can execute computer programs having computer-executable instructions encoded thereon, such as program modules, which are executed by the computer 300. Generally, program modules include routines, programs, objects, components, data structures, etc., that perform particular tasks or implementation particular data types. Preferably the program modules include a file processing module 306, a data display module 307, a logic processing module 308, and a method processing module 309. The logic processing module 308 sends requests to the file processing module 306, the data display module 307 and the method processing module 309 to operate according to the computer-executable instructions. Likewise the logic processing module receives requests from the file processing module 306, the data display module 307 and the method processing module 309 to operate according to the computer-executable instructions. That said the bus 310 also enables communication among the various program modules and the plurality of components. The bus 310 may be any of several types of bus structures including a memory bus or memory controller, a peripheral bus, and a local bus using any of a variety of bus architectures. The computer 300 typically includes a user interface adapter 315, which connects the central processing unit 305 via the bus 310 to one or more interface devices, such as a keyboard 320, mouse 325, and/or other interface devices 330, which can be any user interface device, such as a touch sensitive screen, digitized pen entry pad, etc. The bus 310 also connects a display device 335, such as an LCD screen or monitor, to the central processing unit 305 via a display adapter 340. The bus 310 also connects the central processing unit 305 to a memory 345, which can include ROM, RAM, etc.

The computer 300 further includes a drive interface 350 that couples at least one storage device 355 and/or at least one optical drive 360 to the bus. The storage device 355 can include a hard disk drive, not shown, for reading and writing to a disk, a magnetic disk drive, not shown, for reading from or writing to a removable magnetic disk drive. Likewise the optical drive 360 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 300 that is accessible by the file processing module 306 according to instructions received by the logic processing module 308 in the method described by instructions provided by the method processing module 309.

The computer 300 can communicate via a communications channel 365 with other computers or networks of computers. The computer 300 may be associated with such other computers in a local area network (LAN) or a wide area network (WAN), or it can be a client in a client/server arrangement with another computer, etc. Furthermore, the embodiment may also be practiced in distributed computing environments where task instructions provided by the logic processing module 308 in the method described by instructions provided by the method processing module 309 and are performed by remote processing devices that are linked through a communications network. In a distributed computing environment, the program modules may be located in both local and remote memory storage devices. All of these configurations, as well as the appropriate communications hardware and software, are known in the art.

Figure 4A:
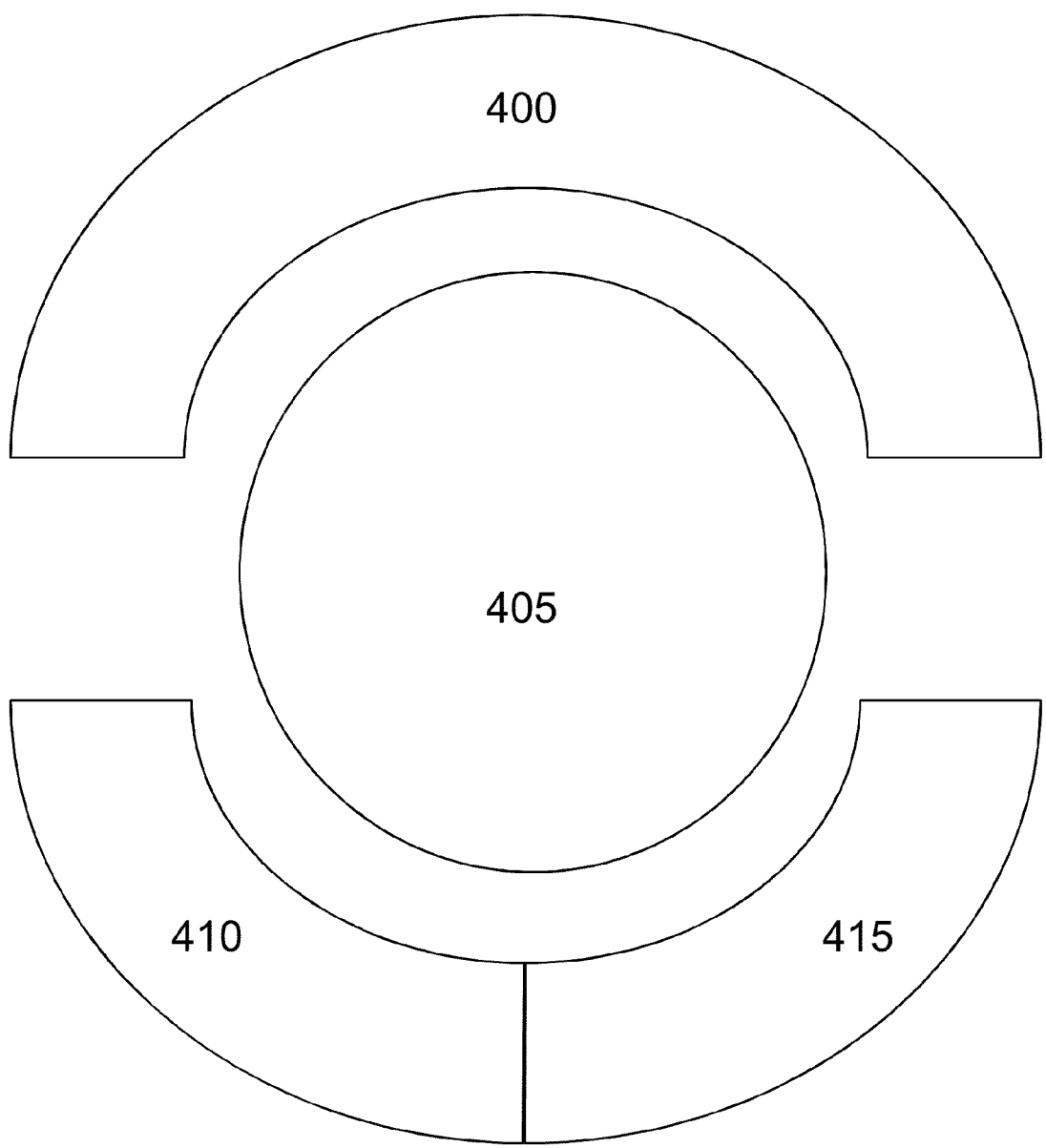
FIGS. 4a-4b illustrate a general concept of a software programming code embodied in a software application.
Figure 4B:
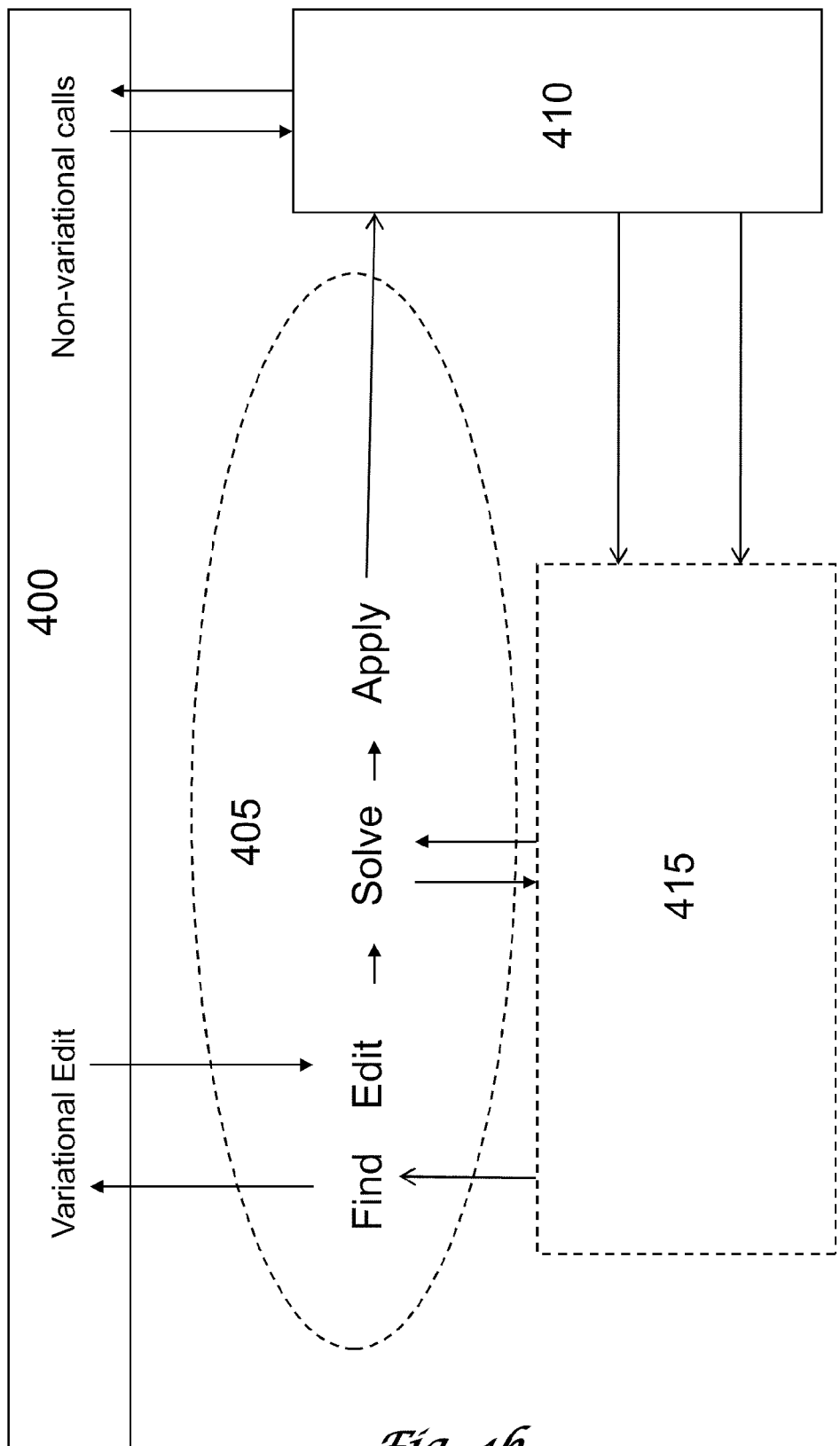

Turning now to the program modules in more detail, FIGS. 4a-4b illustrate a general concept of a software programming code embodied in a software application. Referring further to FIG. 4a, the program modules will be described in more detail below in the context of the embodiment where a software application 400 contains accessible program modules as those discussed above. The software application 400 may be in the form of a solid modeling application such as the aforementioned CAD application 205, the CAE application 210 or CAM application 215. Further it is contemplated that the software application 400 is provided by a third party vendor with particular API ("application programming interface") call features for access and utilization. Continuing, as the user interacts with the software application 400, certain modification events trigger interaction with a variational modeling toolkit 405, to be discussed in greater detail below. The software application 400 and the variational modeling toolkit 405 together or individually utilize the logic processing module 308 in the method described by instructions provided by the method processing module 309 to call a low-level geometric modeling kernel to accomplish the certain modification events of the solid model according to the commands selected by the user and executed by the software application 400, as generally understood in the art of solid modeling, but also discussed in more detail below. The low-level geometric modeling kernel is commonly a collection of at least a three-dimensional (3D) geometric modeler 410 like Parasolid licensed by Siemens Product Lifecycle Management Software Inc and a collection of geometric software component libraries 415 like the 3D DCM product offered by Siemens Product Lifecycle Management Software Inc.

Put another way, referring to FIG. 4b, the variational modeling toolkit 405 operates on variational edit commands communicated from the software application 400. Additionally, the software application 400 communicates non-variational modeling calls to the 3D geometric modeler 410, and the 3D geometric modeler 410 utilizes the collection of geometric software component libraries 415 as normally understood in the art of geometric modelers. With regard to the variational modeling toolkit 405, and to be discussed in greater detail below, several operations occur related to the variational edit that involve find, edit, solve and apply. It is commonly understood in the art of solid modeling that the collection of geometric software component libraries above provides modeling functionality such as geometric constraint solving, variational design, parametric design, motion simulation, collision detection, clearance computations, topology location, topology move solution, and hidden line removal, for example. It is also contemplated to be within the scope of this embodiment that the 3D geometric modeler 410 and the component libraries 415 are components of the same application rather than separate components, or combinations thereof. Having described the computer program product, more detail is now provided with regard to a model modification system.

3. A Model Modification System

Figure 5:
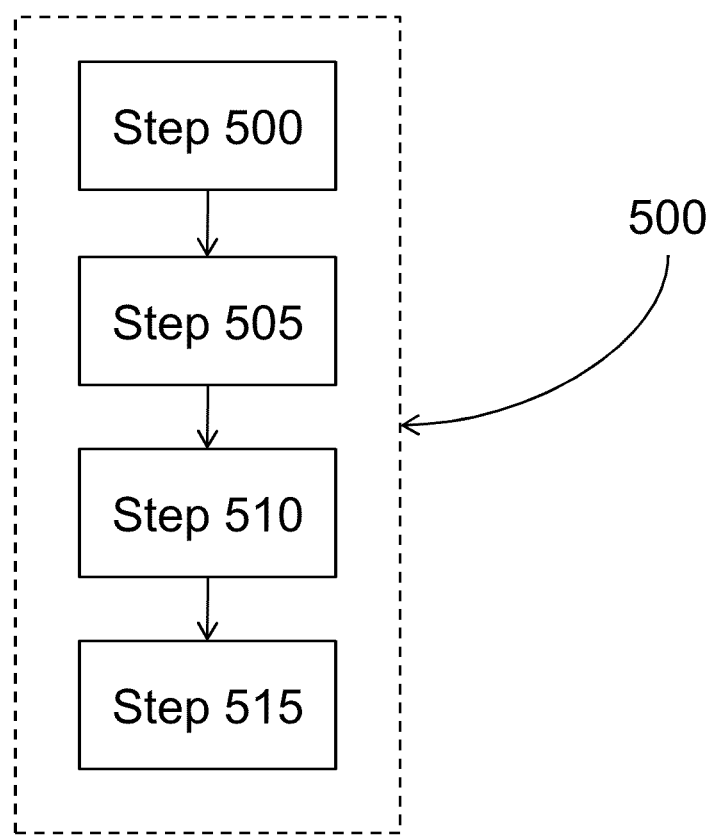
FIG. 5 is a box diagram of a general view of a method employed by the embodiment.

Turning now to the model modification system, FIG. 5 is a box diagram of a general view of a method employed by the embodiment. Referring to FIG. 5, the embodiment discloses the logic processing module 308 using the method described by instructions provided by the method processing module 309, where the described method is a method for modifying geometric relationships in a solid model representation that is manipulated in a computer having software instructions for design, generally depicted at 500. The following steps are mentioned to provide an overview of the embodiment described in the system having details that are subsequently discussed. The system accesses at least one data file having a plurality of geometric model definitions that define a geometric model (Step 500). The system converts the geometric model definitions into a geometric representation of the geometric model (Step 505). The system calculates a plurality of geometric conditions between at least one geometry identified by a user and the geometric model to create a set of constraints (Step 510). The system calculates a modified geometric model with a modified geometry feature according to the set of constraints to display to the user (Step 515).

Figure 6:
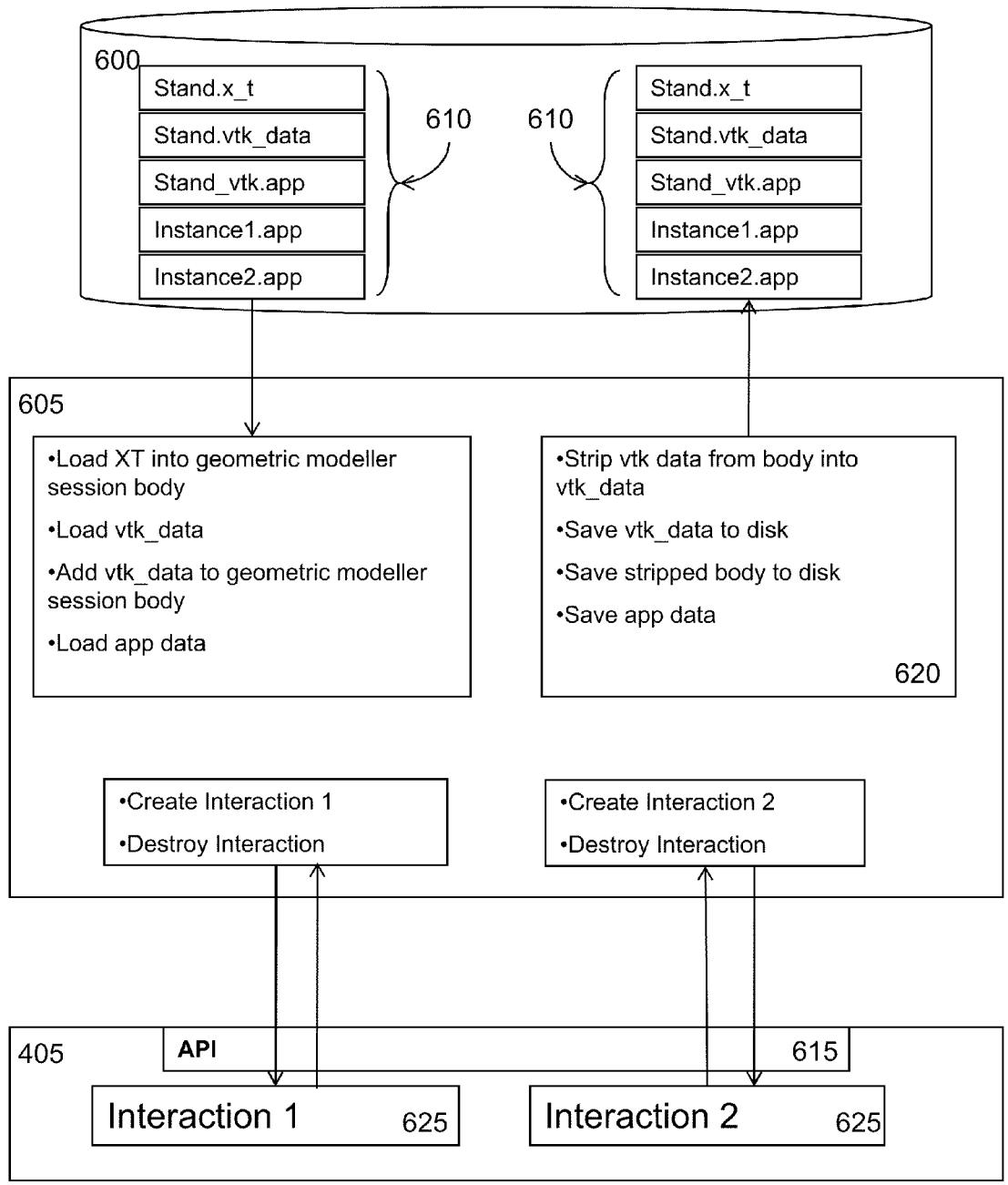
FIG. 6 illustrates an exemplary solid model modification system.

FIG. 6 illustrates an exemplary solid model modification system. Referring to FIG. 6, the user using the software application 400 executes the necessary commands for the software application 400 to access the storage device 355 that is preferably a hard disk drive 600 having data related to a virtual representation of a solid model stored in the solid model data files 225 that are preferably accessible by the software application 400, the variational modeling toolkit 405, the 3D geometric modeler 410 and the component libraries 415. The software application 400 is characterized by a solid modeling application 605 that utilizes the file processing module 308 to accesses the solid model data files 225 structured preferably as data files 610 stored on the hard disk drive 600 in preferably a stand.x_t format that refers to a modeler transmit file type for the 3D geometric modeler 410, a stand.vtk_data format that refers to a variational modeling toolkit information file type for the variational modeling toolkit 405, where stand* refers to a generic part file name. The solid modeling application 605 has its own recognized file type extensions, for example *.APP, which it uses to obtain sufficient information for manipulation of the solid model. Continuing, the solid modeling application 605 access the data files 610 stored on the hard disk drive 600 to load the stand.x_t file into a 3D geometric modeler session body to be accessed by the 3D geometric modeler 410. The stand.vtk_data file is loaded and added to the 3D geometric modeler session body. The solid modeling application 605 loads the application data relating to the solid model and accesses the data files 610 according to its own file type, for example PRT. Once the interaction has been created, to be discussed later, the variational modeling toolkit 405 handles the modification computations by way of the variational modeling toolkit API 615, which is discussed in more detail below. Following the solid model modification, in order to save the modified solid model to the hard disk drive 600, block 620 illustrates the data related to the variational modeling toolkit 405 is striped from the solid model and placed into a vtk_data data structure that is then saved to the stand.vtk_data file. The stripped solid body is also saved to the hard disk drive 600, as is the application data.

4. Model Modification Method

The initialization of the interaction, where there may be more than one interaction, begins when the solid modeling application 605 creates an interaction object 625 and ends when the interaction object 625 is destroyed. The solid modeling application 605 preferably populates the interaction object 625 in a model state with part instances, existing constraints and dimensions that are not available directly from the part, e.g., intra-part, and also specifies which dimensions are hard intent dimensions—those that can be floated and those that can be broken as defined by the user of the solid modeling application 605. The solid modeling application 605 preferably populates the interaction object 625 in the model state with a change topology, where that topology is a face, edge, or vertex ("FEV" that also includes not only the change topology, but also a FEV set that changes with a modification operation provided by the solid modeling application 605. Further the solid modeling application 605 preferably populates the interaction object 625 in the model state with additional information relevant to the solid model and not directly available, e.g., search scope options such as distance and neighborhood that define the environment. The solid modeling application 605 communicates the above by known communication methods such as procedure or API calls to the variational modeling toolkit 405.

The variational modeling toolkit 405 receives the interaction information from the solid modeling application 605 and calculates an intent of the interaction object 625 by searching for geometric relationships between the change topology and other FEVs not in the change topology, by use of known entity searching mechanisms commonly used in the solid modeling application 605, for example coplanar, coaxial, equal radius, tangent and symmetric. The variational modeling toolkit 405 communicates the searched information back to the solid modeling application 605 for selection by preferably the user. Alternatively, selection can occur automatically according to a predefined selection scheme or other known identification method. The solid modeling application 605 optionally recursively searches for geometric relationships between the change topology and other FEVs in an iterative manner in a first level, a second level, up to an n-level of recognition. For example, a first level of recognition applies to those FEVs related to the change topology by one degree, which is to say those searched FEVs that share a feature with the change topology.

Continuing with the intent, the solid modeling application 605 specifies which topology feature in the determined geometric relationships is to be a rigid or a non-rigid feature. The rigid feature is defined by topology whose geometric definition is independent from the host solid model topology. Conversely, the non-rigid feature is defined by topology whose geometric definition is dependent upon the host solid model topology. The variational modeling toolkit 405 provides the above information to the component libraries 415, e.g., a three-dimension dimensional constraint manager (3D DCM) that provides dimension driven, constraint-based design functionality to a range of applications that enables the efficient use of dimensions and constraints to position parts in assemblies and mechanisms, to control the shape of parts and to produce 3D sketches. Further, the user of the solid modeling application 605 indicates the operation type to perform on the change topology, for example change a distance value, drag a feature, or create an offset. Regarding the available operations types, the user may also specify an option to include such as Autodimensioning disclosed and described in "SYSTEM AND METHOD FOR AUTO-DIMENSIONING BOUNDARY REPRESENTATION MODEL" filed on Dec. 18, 2006 with United States Publication Number 2008/0143708. The solid modeling application 605 supplies the selected values for modification to the interaction object 625 taking into account the operation supplied to determine a set of constraints, where the constraints are either inferred or defined or both. The variational modeling toolkit 405 provides the recognized and accepted constraints and dimensions to the 3D DCM, and adds minimal connectivity constraints to hold the sold model together where necessary.

The modification occurs and is applied to the solid model during an update. The solid modeling application 605 modifies the change topology according to the design intent while conforming to the set of constraints by changing a dimension value or the FEV set position by a specified distance, for example. When offsetting face topology it is preferable to pre-calculate the new geometry using the 3D geometric modeler 410. During the update, the variational modeling toolkit 405 solves the constraints and dimensions to determine new FEV locations values, including radii. The update involving the variational modeling toolkit 405 is split into the 3D geometric modeler 410 and solid model part position transforms that are applied to the instance, which can be queried by the solid modeling application 605. The system calculates the geometric model with the modified edit feature for display to the user. In doing so, the variational modeling toolkit 405 preferably applies solved changes to the models represented by the 3D geometric modeler 410, as well as checking for constraint violations caused by the solution provided by the solid modeling application 605. In the case of dragging a FEV set, the software application 400 can repeatedly apply the change set values in a loop by preferably using a rollback procedure to avoid hysteresis. Further the solid modeling application 605 can make further procedure calls to different operations that share the same basic data and form part of the same interaction. The solid modeling application 605 preferably requests any consumed topology faces, updates mapping information for changed faces, part positioning transforms to display the modified solid model to the user, and subsequently destroys the interaction object 625.

5. Application Workflow Examples

Figure 7:
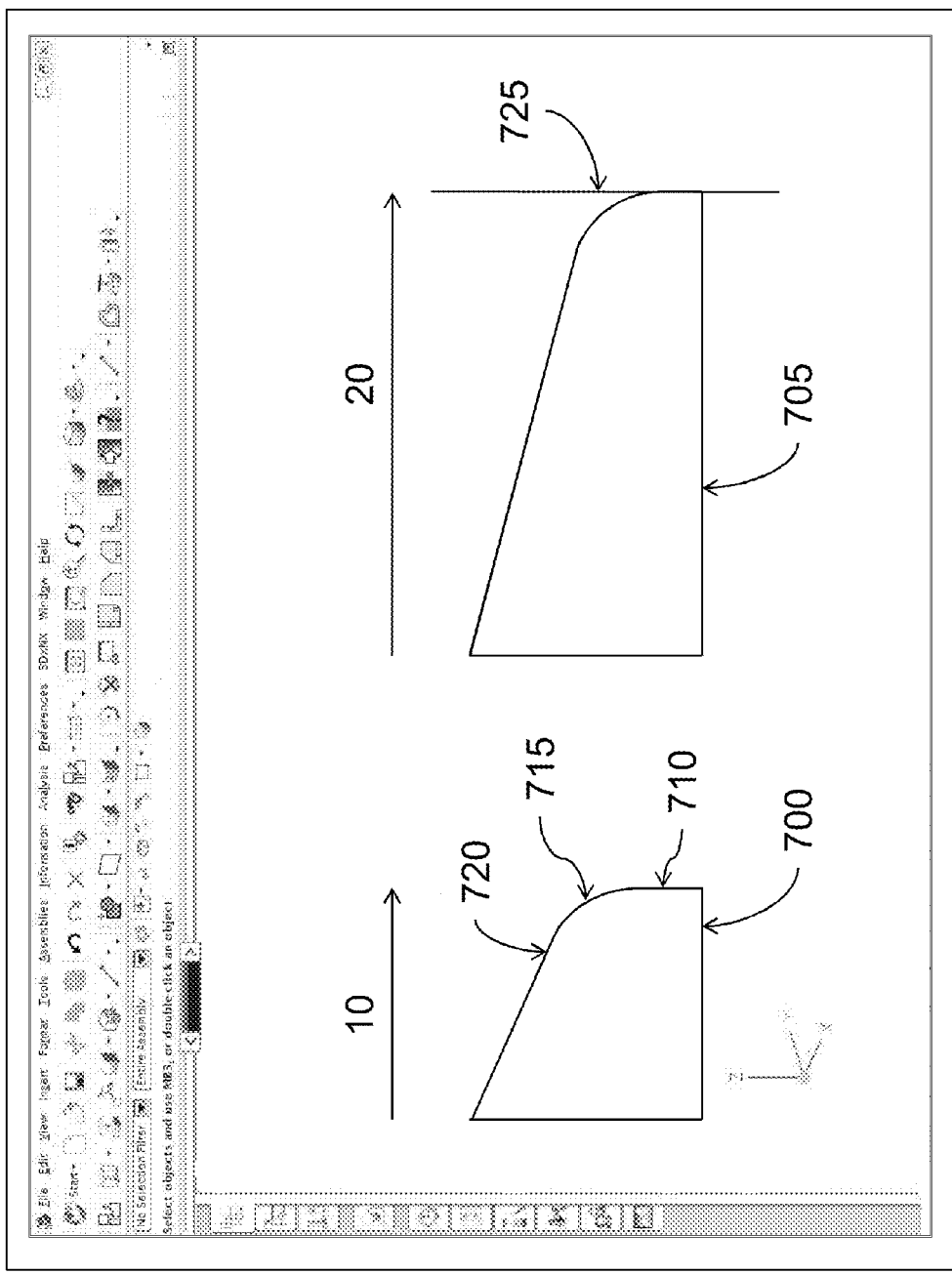
FIG. 7 illustrates a change distance to a plane by use of an exemplary solid model modification system.

FIG. 7 illustrates a change distance to a plane by use of an exemplary solid model modification system. Referring to FIG. 7, the user intends to modify a solid model part 700 by dragging a selected edit portion to a position illustrated at 705. The user activates the solid modeling application 605 illustrated in the display device 335 to load the solid model part. The solid modeling application 605 loads the solid model part 700 a plane face 710 into the variational modeling toolkit 405. Continuing the variational modeling toolkit 405 also recognizes a cylinder face 715 as tangent to the plane face 710 by help from the solid modeling application 605. The solid modeling application 605 adds the cylinder face 715 to a select set, and recursively checks to see if there are any other FEV sets that could be modified. The variational modeling toolkit 405 further identifies an angled face 720 as currently tangent to the cylinder face 715 and adds it to the select set. The user intends to make the plane face 710 fixed, but determines the select set as non-rigid. The non-rigid feature is one whose geometric definition is dependent upon a host model topology. Further determining constraints, the plane face 710 and the cylinder face 715 are constrained tangent, as well as the cylinder face 715 and the angled face 720 are constrained tangent. Further an autodimensioning operation option adds a distance from a distant parallel plane 725 to the selected plane face 710. The user utilizes tools provided by the solid modeling application 605 to graphically drag the select set the autodistance from the plane face 710 location to the distant parallel plane 725 location.

Figure 8:
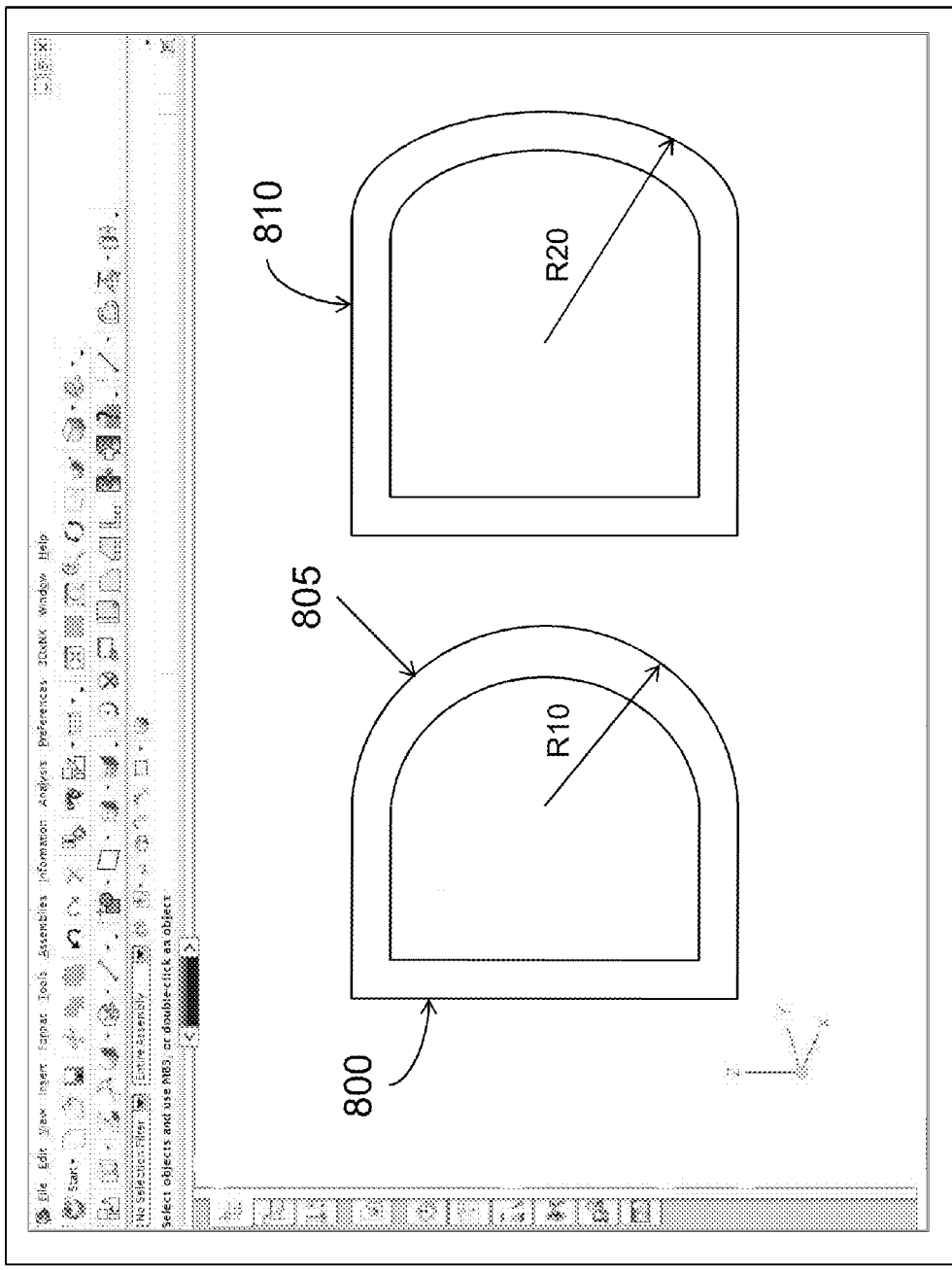
FIG. 8 illustrates a change arc radius by use of an exemplary solid model modification system.

FIG. 8 illustrates a change arc radius by use of an exemplary solid model modification system. Referring to FIG. 8, the user intends to modify a solid model part 800 by altering a numerical radius value from 10 units to 20 units. The user activates the solid modeling application 605 illustrated in the display device 335 to load the solid model part 800 into the variational modeling toolkit 405. A selected edge 805 is also identified and loaded into the variational modeling toolkit 405 in such a manner so that a shell feature is recognized and identified by the variational modeling toolkit 405. The software application 400 adds the selected edge 805 to a select set, and recursively checks to see if there are any other FEV sets that could be modified. The variational modeling toolkit 405 recognizes the selected edge 805 is on a face topology so that the relevant face topologies are added to the variational modeling toolkit 405. The user selects a change radius operation by use of the solid modeling application 605 that communicates the necessary procedure calls to the variational modeling toolkit 405. The selected edge 805 is constrained coincident to the face topology, while the cylinder face is determined to be non-rigid. As before the non-rigid cylinder face is dependent upon the host model topology. The distance between the relevant shell faces is calculated and the new value of the radius is applied. The variational modeling toolkit 405 communicates a new location 810 for the offset and changed faces of both cylinder radii back to the solid modeling application 605 for viewing in the display device 335 by the user.

6. Conclusion

The embodiment may be implemented in digital electronic circuitry, or in computer hardware, firmware, software, or in combinations thereof. An apparatus of the embodiment may be implemented in a computer program product tangibly embodied in a machine-readable storage device for execution by a programmable processor; and method steps of the embodiment may be performed by a programmable processor executing a program of instructions to perform functions of the embodiment by operating on input data and generating output.

The embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include numerous forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the embodiment. Therefore, other implementations are within the scope of the following claims.

What is claimed is:

1. A system for modifying a solid model representation that is manipulated in a computer having software instructions for design, comprising:
a computer system, wherein the computer system includes a memory, a processor, a user input device, and a display device; and
a computer generated geometric model stored in the memory of the computer system, wherein the computer system
receives user input and accesses at least one data file having a plurality of geometric model definitions that define a geometric model, wherein the user input comprises at least one geometry identified to be modified, wherein the at least one geometry identified comprises a face, an edge, or a vertex which a user intends to modify;
converts the geometric model definitions into a geometric representation of the geometric model;
calculates a plurality of geometric conditions between the at least one geometry identified by the user input and the geometric model;
determines which of the plurality of geometric conditions are rigid, and which of the plurality of geometric conditions are non-rigid to create a set of constraints, wherein rigid geometric conditions are independent of a topology of the geometric model, and non-rigid geometric conditions are dependent upon the topology of the geometric model;
creates an interaction object modeled based on an existing feature of the geometric model, wherein the existing feature of the geometric model can be modified using the interaction object, and wherein the existing feature of the geometric model is defined by the face, the line, or the vertex corresponding to the identified geometry, including populating the interaction object with existing constraints and dimensions, wherein the existing constraints and dimensions are populated by the computer system at the time of creation of the interaction object and the population includes constraints and dimensions from both part and intra-part relations;
calculates a design intent of the interaction object according to the geometric conditions;
calculates a modified geometric model with a modified geometry according to the set of constraints to display to the user and according to the design intent, including performing a recursive process to identify other face, edge, and vertex sets that can be modified; and
destroys the interaction object.

2. The system of claim 1, wherein the computer system further saves a modified geometric representation of the modified geometric model into the at least one data file.

3. The system of claim 1, wherein the computer system further removes the set of constraints from the geometric model.

4. The system of claim 1, wherein the at least one data file is one of a geometric modeler transmit file, a modeling toolkit information file, and a solid model part file.

5. The system of claim 1, wherein the geometric representation is in a boundary representation format.

6. The system of claim 1, wherein the geometric model is a solid model.

7. The system of claim 1, wherein the plurality of geometric conditions is calculated in a recursive manner to at least one level of recognition.

8. A non-transitory computer readable medium having computer readable program code embodied therein, the computer readable program code adapted to be executed by a computer processor to implement a method for modifying a solid model representation, the method comprising:
providing a model file processing module, a data display organization module, a logic processing module, a method processing module;
accessing a plurality of model data files that specifies:
a modeler transmit data used in a geometric modeling session,
a modification information data applied to the geometric modeling session, and
a model application data affected by the geometric modeling session,
wherein the accessing is performed by the model file processing module in response to being called by the logic processing module;
identifying a plurality of geometric conditions in the model application data between at least one geometry and a geometric model;
determining which of the plurality of geometric conditions are rigid, and which of the plurality of geometric conditions are non-rigid to determine a set of constraints, wherein rigid geometric conditions are independent of a topology of the geometric model, and non-rigid geometric conditions are dependent upon the topology of the geometric model, wherein said identifying is performed by the method processing module in response to being called by the logic processing module;
calculating a modified geometric model adhering to the set of constraints, including performing a recursive process to identify other face, edge, and vertex sets that can be modified, wherein said calculating is performed by the method processing module in response to being called by the logic processing module, wherein the modified geometric model is calculated using a design intent of an interaction object that is created for a user modification and is destroyed after the modified geometric model has been calculated, wherein the interaction object is modeled based on an existing feature of the geometric model, wherein the existing feature of the geometric model can be modified using the interaction object, and wherein the existing feature of the geometric model is defined by a face, a line, or a vertex which corresponds to the identified geometry, and wherein the creation of the interaction object includes populating the interaction object with existing constraints and dimensions derived from part and intra-part relations; and
organizing for display according to set of constraints, by the data display organization module in response to being called by the logic processing module, the modified geometric model received by the logic processing module, wherein said organizing comprises utilizing the plurality of geometric conditions calculated by the logic processing module.

9. A method for modifying a solid model representation using a computer having software instructions for design, comprising:
accessing at least one data file, by the computer, having a plurality of geometric model definitions that define a geometric model;

converting the geometric model definitions into a geometric representation of the geometric model by the computer;

calculating a plurality of geometric conditions between at least one geometry identified by a user and the geometric model;

determining which of the plurality of geometric conditions are rigid, and which of the plurality of geometric conditions are non-rigid to create a set of constraints, wherein rigid geometric conditions are independent of a topology of the geometric model, and non-rigid geometric conditions are dependent upon the topology of the geometric model; and calculating, by the computer, a modified geometric model with a modified geometry according to the set of constraints to display to the user, including performing a recursive process to identify other face, edge, and vertex sets that can be modified, wherein the modified geometric model is calculated using a design intent of an interaction object that is created for a user modification and is destroyed after the modified geometric model has been calculated, wherein the interaction object is modeled based on an existing feature of the geometric model, wherein the existing feature of the geometric model can be modified using the interaction object, and wherein the existing feature of the geometric model is defined by a face, a line, or a vertex which corresponds to the identified geometry, and wherein the creation of the interaction object includes populating the interaction object with existing constraints and dimensions derived from part and intra-part relations.

10. The method of claim 9, further comprising displaying the geometric representation of the geometric model to the user.

11. The method of claim 9, further comprising saving a modified geometric representation of the modified geometric model into the at least one data file.

12. The method of claim 9, further comprising removing the set of constraints from the geometric model.

13. The method of claim 9, wherein the at least one data file is one of a geometric modeler transmit file, a modeling toolkit information file, and a solid model part file.

14. The method of claim 9, wherein the geometric representation is in a boundary representation format.

15. The method of claim 9, wherein the geometric model is a solid model.

16. The method of claim 9, where calculating a plurality of geometric conditions occurs in a recursive manner to at least one level of recognition.

17. A system for modifying a solid model; comprising
a computer system, wherein the computer system includes a memory, a processor, a user input device, and a display device;
a computer generated geometric model stored in the memory of the computer system, wherein the computer system
accesses a data file containing instructions to calculate a display of a solid model;
examines a current geometry state of the solid model;
joins the current geometry state with a plurality of user defined constraints and user defined rigid and non-rigid geometry features on the solid model, wherein rigid geometric conditions are independent of a topology of the solid model, and non-rigid geometric conditions are dependent upon the topology of the solid model;
localizes a plurality of dependencies in real-time with the joined current geometry state for solid model; and
edits the solid model having the localized plurality of dependencies, using a design intent of an interaction object that is created for a user modification and is destroyed after the solid model is edited, including performing a recursive process to identify other face, edge, and vertex sets that can be modified, wherein the interaction object is modeled based on an existing feature of the geometric model, wherein the existing feature of the geometric model can be modified using the interaction object, and wherein the existing feature of the geometric model is defined by a face, a line, or a vertex which corresponds to the identified geometry, and wherein the creation of the interaction object includes populating the interaction object with existing constraints and dimensions derived from part and intra-part relations.

18. The system of claim 17, wherein the localized dependencies are a plurality of topology features.

19. The system of claim 18, wherein the plurality of topology features are at least one of a face, an edge, and a vertex.

* * * * *